United States Patent [19]
Yuki et al.

[11] 4,067,894
[45] Jan. 10, 1978

[54] PROCESS FOR THE PRODUCTION OF GRANULAR METAL-CAPTURING AGENTS FOR TREATING WASTE EFFLUENTS CONTAINING HEAVY METALS

[75] Inventors: Nakaji Yuki, Kawaguchi; Akio Yauchi, Tokyo, both of Japan

[73] Assignee: Director-General of the Agency of Industrial Science and Technology, Tokyo, Japan

[21] Appl. No.: 666,054

[22] Filed: Mar. 11, 1976

[30] Foreign Application Priority Data
May 6, 1975 Japan .................................. 50-54371

[51] Int. Cl.$^2$ ............................................. B01J 21/16
[52] U.S. Cl. ................................... 252/446; 252/428; 252/430; 252/455 R; 210/38 B
[58] Field of Search ................... 252/428, 430, 455 R, 252/447, 446

[56] References Cited
U.S. PATENT DOCUMENTS

| 3,396,123 | 8/1968 | Urban | 252/428 |
| 3,669,889 | 6/1972 | Juzvuk et al. | 252/455 R X |
| 3,960,760 | 6/1976 | Sanga et al. | 252/455 R X |

FOREIGN PATENT DOCUMENTS

| 1,150,953 | 7/1963 | Germany | 252/430 |

Primary Examiner—Patrick P. Garvin
Attorney, Agent, or Firm—William J. Daniel

[57] ABSTRACT

Granular metal-capturing agents suitable for treating waste effluents containing heavy metals are obtained by mixing 100 parts by weight of waste clay which has been subjected to a preliminary dry distillation treatment with 25–40 parts by weight of an organic carbonaceous binder agent such as coking coal, granulating 100 parts by weight of this mixture together with 8–15 parts by weight of an organic pelletizing agent such as sulfite pulp waste liquor, and thereafter subjecting the resulting granules to a dry distillation treatment conducted at 450°–900° C.

5 Claims, No Drawings

PROCESS FOR THE PRODUCTION OF GRANULAR METAL-CAPTURING AGENTS FOR TREATING WASTE EFFLUENTS CONTAINING HEAVY METALS

BACKGROUND OF THE INVENTION

The present invention relates to a process for the production of granular metal-capturing agents for treating waste effluents containing heavy metals, which agents are economical in cost and excellent in water-permeability and other performance characteristics.

It has been known hitherto to capture heavy metals contained in waste effluents by conventional methods wherein chemicals, active carbon and ion-exchange resins are used as the metal-capturing agent. However, such methods are expensive and are not satisfactory because of their inferior capturing action.

BRIEF SUMMARY OF THE INVENTION

In accordance with the present invention, there is provided a process for the production of granular metal-capturing agents for treating waste effluents containing heavy metals, characterized by mixing 100 parts by weight of waste which has been subjected to a preliminary dry distillation treatment, with 25-40 parts by weight of an organic caking or binder agent, granulating 100 parts by weight of this mixture together with 8-15 parts by weight of an organic pelletizing agent, and thereafter subjecting the resultant granules to a dry distillation treatment conducted at 450°-900° C.

It is an object of the present invention to provide a process for the production of granular metal-capturing agents for treating waste effluents containing heavy metals, which agents are economical in cost and excellent in water-permeability.

It is another object of the present invention to provide a process for the production of granular metal-capturing agents possessing extremely high heavy metal-capturing activity suitable for treating waste effluents containing heavy metals.

It is further object of the present invention to provide a process for the production of granular metal-capturing agents of good quality suitable for treating waste effluents containing heavy metals wherein waste clay which is an industrial waste material is effectively utilized as a starting material.

Other and further objects, features and advantages of the invention will appear more fully from the following description.

DETAILED DESCRIPTION OF THE INVENTION

In the present invention, 100 parts by weight of waste clay which has been subjected to a preliminary dry distillation are mixed with 25-40 parts by weight of an organic caking or binding agent. By the term "waste clay" used herein is meant waste acid clay which has been used for the treatment of oils of petroleum series and animal or vegetable oils. This waste clay usually contains about 30-60% oils. In the present invention, the waste clay has to be subjected, prior to actual use, to a preliminary dry distillation treatment to reduce the oil content to less than about 10%, preferably less than 5%. The temperature required for this treatment is preferably kept at about 400° C.

The organic caking or binding agent should be capable of forming a strongly solidified coke as a result of the dry distillation treatment which will be discribed hereinafter. Example of the organic caking agent include coking coal, coal tar pitch, petroleum pitch, asphalt and swelling coal, all of which are carbonaceous binders.

If the amount of the organic coking agent is less than 25 parts by weight per 100 parts by weight of the waste clay, the ultimate product will have weak mechanical strength. On the other hand, if the amount of the organic binder agent is more than 40 parts by weight per 100 parts by weight of the waste clay, the granules will mutually adhere together during the subsequent dry distillation treatment.

According to the process of this invention, 100 parts of a mixture of the waste clay and the organic binder agent are admixed with 8-15 parts by weight of an organic granulating or pelletizing agent and shaped into granules which are then subjected to a dry distillation treatment conducted within a difined temperature range whereby the desired granular metal-capturing agent for treating waste effluents containing heavy metals is obtained. Examples of the organic granulating or pelletizing agent include organic materials having adhesive property at normal temperature such as sulfite pulp waste liquor (black liquor), blackstrap molasses, starch, a distillation residue of alcohol, sodium carboxymethyl cellulose, polyvinyl alcohol, etc. As described above, the organic pelletizing agent is conveniently used in an amount of 8-15 parts by weight per 100 parts by weight of the mixture of the waste clay and the organic carbonaceous binder agent. If the amount of the organic pelletizing agent incorporated is less than 8 parts by weight per 100 parts by weight of the mixture, the strength of the granules will be poor. On the other hand, if the amount of the organic pelletizing agent is more than 15 parts by weight per 100 parts by weight of the mixture, troubles will occur in the pelletizing operation.

In the present invention, pelletization of the mixture is usually conducted by the aid of a granulating or pelletizing machine whereby granules with an appropriate size, for example, 0.5-1 mm or 1-2 mm in granule diameter are obtained.

The granules are then heated usually in a dry distillation furnace at 450°-900° C for 1-4 hours to effect dry distillation whereby the desired granular metal-capturing agent is obtained. If the heating temperature is lower than 450° C, carbonization of the granules will become insufficient so that the mechanical strength and activity of the product will become inferior. If the heating temperature exceeds 900° C, however, a special material will be necessary for construction of the dry distillation apparatus, thus resulting in increase of the cost. Moreover, such a high temperature does not contribute materially to improvement in quality of the product. If the time required for the dry distillation is shorter than 1 hour, the content of volatile material in the granules will remain too high so that the strength of the product will become weak and the formation of microporous structure will not become satisfactory. If the time required for the dry distillation is longer than 1 hour, the mechanical strength and the quality of the product will be improved as the duration of the distillation increases. However, if the time exceeds 4 hours, no further improvement in the mechanical strength and quality of the product will result.

The metal-capturing agent obtained by the process of this invention can be used for effectively eliminating heavy metals from an aqueous solution containing such heavy metals by bringing the agent into contact in a suitable manner with the aqueous solution to adsorb the heavy metals. For example, heavy metals such as mercury, copper, cadmium, lead, chromium, etc. can be eliminated at an efficiency of 99.5% or more. The main starting material for the metal-capturing agent is an industrial waste, i.e. waste clay, and so is readily available. In addition, the process for producing the metal-capturing agent is so simple that the metal-capturing agent can be produced economically in large amounts. As the shape of the metal-capturing agent is granular, the agent is excellent in water-permeability and convenient for actual use.

To further illustrate the present invention, and not by way of limitation, the following examples are given.

EXAMPLE 1

To 100 parts by weight of waste clay having an oil content of 5%, which had been obtained by subjecting waste clay having an oil content of 30% to dry distillation, were added 40 parts of Akahira coal, as a caking or binding agent, which had been pulverized to have a particle size of 100 mesh or more. To 100 parts by weight of the mixture were then added 15 parts by weight of blackstrap molasses as a granulating pelletizing agent. The mixture was shaped into granules having a granule diameter of 0.5-1 mm by means of a disk pelletizer with occasional addition of water. The granules were then heated in a rotary kiln at temperatures of 600°-900° C for 1-2 hours to effect dry distillation whereby the desired metal-capturing agent was obtained. The yields of the product when the dry distillation was carried out for 2 hours at 600° C, 700° C, and 800° C, were 76.0% by weight, 74.0% by weight and 72.0% by weight, respectively. The yield of the product with dry distillation for 1 hour at 900° C was 70.0%. The metal-capturing activity of the reesulting products was examined in the following manner: To 100 parts by weight of an aqueous solution of 5 ppm mercuric chloride (containing 5 ppm mercury) was added 0.4 part by weight of the metal-capturing agent. The mixture was shaken for 2 hours and then filtered. When the filtrate was analyzed for any remaining mercury by a flameless atomic absorption spectra analyzer, the mercury concentration was determined as 0.001 ppm for all of metal-capturing agents examined.

For the purpose of comparison, the metal-capturing activity of generally recommended commercially available active carbons A (coconut husk active carton), B (active carbon of coal series) and C (active carbon of coal series) was examined in the same manner as described above. In these comparative tests, the concentration of the remaining mercury was determined as 0.2-2.4 ppm. A comparison of these test results obviously shows that the metal-capturing agent produced according to the process of this invention has an extremely high metal-capturing activity.

EXAMPLE 2

Concerning the metal-capturing activity, a comparison was made between the metal-capturing agent obtained in Example 1 and dry distilled waste clay alone. To separate 100 part by weight samples of an aqueous solution of 10 ppm cupric sulfate (containing 10 ppm copper) was added 0.4 part by weight of the metal-capturing agent of Example 1 or dry distilled waste clay. The mixture was shaken for 2 hours and then filtered. The concentration of any remaining copper in the filtrate was measured by a photoelectric colorimeter according to the method of JIS K0102.

The concentration of the remaining copper in the case of using the metal-capturing agent of Example 1 dry distilled at 600° C, 700° C, 800° C or 900° C was determined as 0.040 ppm, 0.020 ppm, 0.07 ppm and 0.07 ppm, respectively. On the other hand, the concentration of the remaining copper when using the dry distilled waste clay alone, after distillation, at 600° C, 700° C, 800° C or 900° C, was determined as 0.90 ppm, 0.40 ppm, 2.71 ppm or 2.70 ppm, respectively.

These results obviously show that the use of the metal-capturing agent obtained by incorporating waste clay with the binding agent and the pelletizing agent and subjecting the mixture to dry distillation is much more effective in metal-capturing activity than the use of dry distilled waste clay alone.

EXAMPLE 3

To 100 parts by weight of waste clay having an oil content of 5%, which had been obtained by subjecting waste clay having an oil content of 30% to dry distillation, were added 35 parts by weight of finely pulverized coal tar pitch as a binding agent. To 100 parts by weight of this mixture were then added 15 parts by weight of sulfite pulp waste liquor as a pelletizing agent. The mixture was shaped into granules having a granule diameter of 0.5-1 mm by means of a disk pelletizer with occasional addition of water. The granules were then heated in a rotary kiln at temperatures of 800° C and 900° C for 2 hours to effect dry distillation whereby the desired metal-capturing agent was obtained. The yields in these cases were 70% and 67% by weight.

The metal-capturing activity of the resultant two kinds of metal-capturing agents was examined in the following manner: To 100 parts by weight of an aqueous solution of 10 ppm cadmium sulfate (containing 10 ppm cadmium) was added 0.4 part by weight of the metal-capturing agent. The mixture was shaken for 2 hours and then filtered. When the concentration of any remaining cadmium in the filtrate was measured by an atomic absorption spectra analyzer, the concentration was determined as 0.07 ppm in both cases. For the purpose of comparison, a similar test was made for the above mentioned three types of commercially available active carbon A, B and C. The concentration of the remaining cadmium in this comparative test was determined as 10-9.5 ppm. These result obviously shows that these active carbons are substantially devoid of the cadmium ion-capturing activity.

What is claimed is:

1. A process for the production of granular metal-capturing agents for treating waste effluents containing heavy metals, characterized by subjecting a waste clay from an oil purification treatment to a preliminary dry distillation treatment to reduce the oil content thereof to less than 10%, mixing 100 parts by weight of said treated waste clay with 25-40 parts by weight of an organic carbonaceous binding agent, pelletizing 100 parts by weight of this mixture together with 8-15 parts by weight of an organic pelletizing agent, and thereafter subjecting the resultant granules to a dry distillation treatment conducted at 450°-900° C for a time of at least 1 hour.

2. A process according to claim 1 wherein said organic carbonaceous binder agent is at least one of the materials selected from the group consisting of coking coal, coal tar pitch, petroleum pitch, and asphalt.

3. A process according to claim 1 wherein said organic pelletizing agent is at least one of the materials selected from the group consisting of sulfite pulp waste liquor, blackstrap molasses, starch, sodium carboxymethyl cellulose and polyvinyl alcohol.

4. A process according to claim 1 wherein said preliminary dry distillation treatment reduces the oil content of said waste clay to less than 5%.

5. Granular metal-capturing agents for treating waste effluents containing heavy metals obtained according to the process claimed in claim 1.

* * * * *